July 23, 1963
G. E. WISE
3,098,573
UTILITY VEHICLE
Filed Aug. 24, 1960
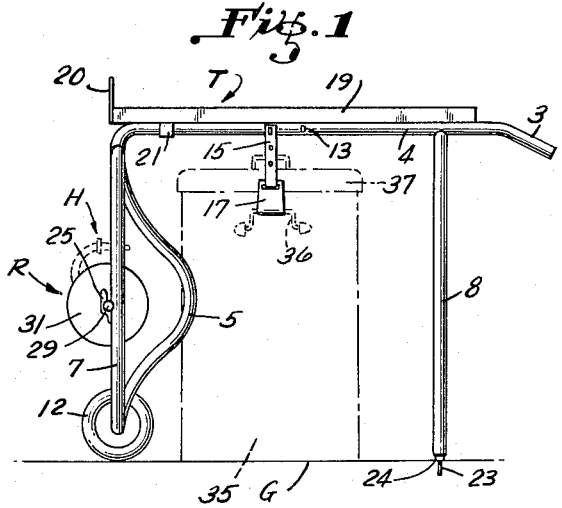
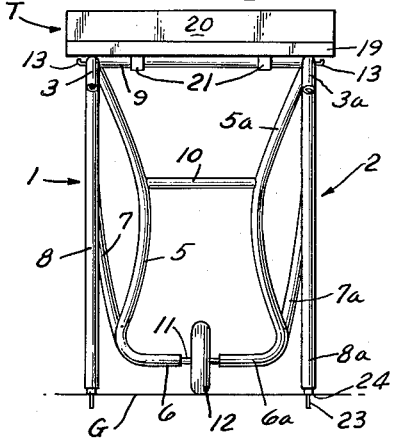
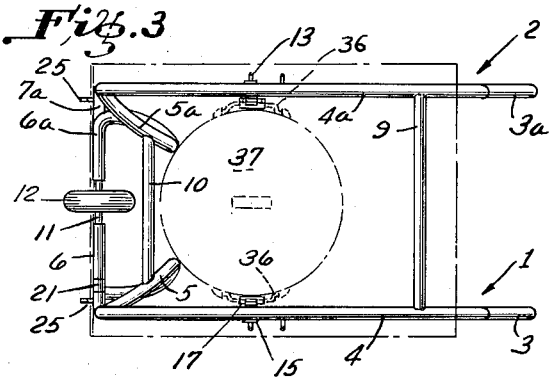
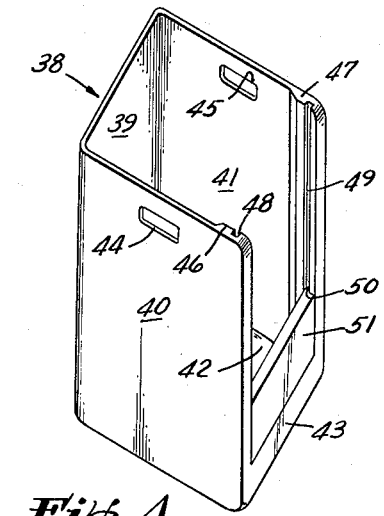
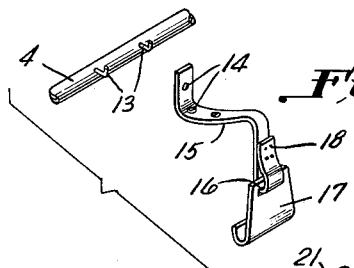
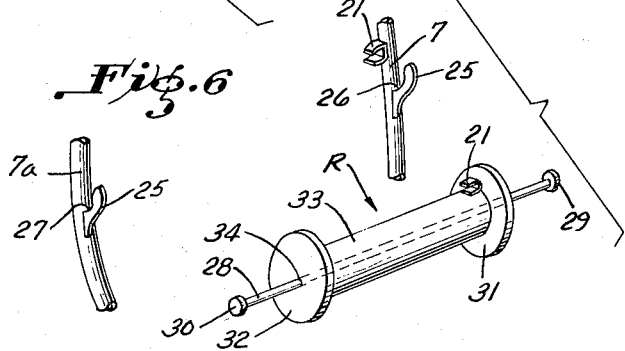
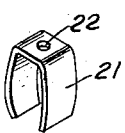
INVENTOR
*Glenn E. Wise*

3,098,573
UTILITY VEHICLE
Glenn E. Wise, 501 13th St. NW., Washington 4, D.C.
Filed Aug. 24, 1960, Ser. No. 51,593
6 Claims. (Cl. 214—394)

This invention relates to a vehicle, and, more particularly, to a utility vehicle capable of performing a variety of functions around a home and yard.

My vehicle is particularly designed as a barrow-type vehicle for transporting a garbage can, or the like, but it is also capable of serving as a portable support for a table or a hose reel.

One object of my invention, therefore, is to provide a multi-purpose or utility vehicle for use around a house and yard.

Another object of my invention is to provide a barrow-like vehicle for transporting a garbage can or the like, the vehicle being designed in such manner that the full weight of the garbage can never need be lifted by a user.

Another object of my invention is to provide a load-carrying vehicle having means for stabilizing a load during transport.

Other objects will be apparent from the remainder of the specfication, and from the drawings.

In the drawings which form a part of this application:

FIGURE 1 is a side elevational view of my invention, with a conventional garbage can and a portion of a noozle-carrying hose shown attached thereto in phantom lines;

FIGURE 2 is a rear elevational view of the structure of FIGURE 1 with certain parts removed for the sake of clarity;

FIGURE 3 is a plan view of the structure shown in FIGURE 1 except that the hose reel has been removed, and the table attachment and garbage can are shown in phantom lines for clarity;

FIGURE 4 is a three-dimensional showing of an all-purpose receptacle which may be transported by my vehicle in place of the garbage can seen in FIGURES 1 and 3;

FIGURE 5 is a three-dimensional exploded view showing a portion of my vehicle frame as well as a strap-attached carrying hook which I employ;

FIGURE 6 is an exploded three-dimensional view showing a portion of my vehicle frame and means for supporting a hose reel thereon, as well as the reel itself; and, FIGURE 7 is a three-dimensional showing of a resilient clip of the type I employ for removably attaching my table to the vehicle frame, and also for securing hose parts to the frame and reel.

Referring now more particularly to FIGURES 1 to 3 of the drawings, my vehicle is composed of two opposite, but otherwise identical, hollow tubular frame assemblies designated generally as 1 and 2. Since assemblies 1 and 2 are identical except for being opposites, a description of assembly 1 will also serve to fully describe assembly 2.

Frame assembly 1, as seen from right to left in FIGURE 1, includes an upwardly inclined handle portion 3 which merges into, and is integral with a substantially horizontal load-supporting portion 4. Portion 4, at its forward end, merges into, and is integral with, knee-forming portion 5 which slopes inwardly and rearwardly down from portion 4, and then outwardly and forwardly down in its lower reaches thus forming an arcuate knee. At its lower end, knee-forming portion 5 merges into a substantially horizontal, inwardly directed axle-receiving portion 6. Welded or otherwise fastened to the knee-forming portion 5 near its uppermost extent and also to portion 5 near its lowermost extent is an arcuate brace and reel-supporting portion 7. Also welded to frame assembly 1, and, more specifically, to the underside of supporting portion 4 just forwardly of the juncture of portions 3 and 4 is a vertically disposed leg 8.

This completes the description of frame assembly 1. The parts of frame assembly 2 which are opposites, but otherwise identical to parts 3, 4, 5, 6, 7 and 8 of frame assembly 1 are numbered 3a, 4a, 5a, 6a, 7a and 8a.

To tie assemblies 1 and 2 together into a unitary vehicle frame, I first provide rear cross brace 9, one end of which is welded to the inside rear end of portion 4, and the other end of which is welded to the inside rear end of portion 4a. Next I provide a front cross brace 10 which spans between and is welded at its opposite ends to portions 5 and 5a a noticeable distance above and forwardly of the most rearward extent of portions 5 and 5a. And, finally, I provide a combined axle and brace member 11 which is entered into the open ends of the opposed tubular axle-receiving portions 6 and 6a and then welded to said latter portions. However, before member 11 is welded-in, as described, the hub of a hub-including wheel assembly 12 is fixed upon member 11 at its mid-length by means of set screws, or the like, not shown, conventionally provided on such wheel assemblies.

Having described a barrow-like vehicle, I will now described certain additions thereto which render the vehicle capable of performing several functions.

First, to render my vehicle capable of transporting suspended loads, such as a conventional garbage can of the type shown in phantom lines in FIGURES 1 and 3, or the special all-purpose receptacle shown in FIGURE 4, I provide a plurality of strap-receiving hooks 13, half of which are welded to the outside of each of portions 4 and 4a at about their respective mid-lengths. These hooks are adapted to enter into any one of a plurality of apertures 14 formed in a leather, or the like strap 15, best seen in FIGURE 5. Strap 15 at its lower end loops through an aperture 16 in a J-shaped hook 17, and thence reverses its direction and is fastened to itself by means of riveting or stitching, or the like, 18. One of these strap and hook assemblies is provided for attachment to each of portions 4 and 4a. When the two strap and hook assemblies are attached to portions 4 and 4a, my vehicle is in condition to transport a suspended load as will be described.

Although the invention is designed primarily as a vehicle for transporting a suspended load, its form renders it useful for other purposes. In FIGURES 1, 2 and 3 is shown a table attachment, designated generally by T, which is adapted for removable attachment to the vehicle frame. More specifically, table attachment is composed of a table portion 19, a stop flange 20 attached by means of screws, or the like, not shown, to one end of portion 19, and four resilient metal clips 21, two of which are fastened by means of screws, not shown, to the rear bottom side of portion 19 in such location as to be removably engageable with brace 9, when desired, and two of which are fastened by means of screws, not shown, to the forward bottom side of portion 19 in such locations as to be removably engageable, one clip with frontal portions of each of portions 4 and 4a, when desired.

One of clips 21 is shown enlarged in FIGURE 7. It is U-shaped and the legs of the U are adapted to be resiliently biased apart when engaging the frame, as described. Aperture 22 is provided in the base of the clip, and a fastening screw, previously mentioned, enters this aperture in fastening this clip to the bottom of table portion 19.

At the bottoms of legs 8 and 8a are projection elements 23. Elements 23 are integral with and extend down from the bottoms of plug elements 24 which extend upwardly and are fixed, as by welding or the like, into the lower ends of the tubular legs 8 and 8a. The purpose of projections 23 is to enter into the ground G when required to restrain the vehicle from rolling, for example, down a slope, or when hose is being unwound from the hose reel.

Welded, or otherwise joined to the front side of each brace portion 7 and 7a is an upstanding finger 25. These fingers 25 combine with braces 7 and 7a to form spaced notches 26 and 27 which are adapted to removably receive and support the opposite ends of the axle on a hose reel of the type designated generally at R in FIGURES 1 and 6.

Reel R, more particularly, includes an axle 28 on opposite ends of which are welded circular stop flanges 29 and 30, the purpose of which is to abut the outsides of braces 7 and 7a to prevent axle 28 from shifting out of notches 26 and 27, and also to keep braces 7 and 7a from spreading apart. Centrally of axle 28 and concentric therewith is fastened a hose-receiving spool composed of two large, spaced side flanges 31 and 32 welded to the opposite ends of a tube 33. The spool is fixed on axle 28 by passing axle 28 through a central aperture in each side flange and then welding the side flanges to the axle. (Only one of these apertures shows in the drawings and it is numbered 34.) Another resilient clip 21 can be affixed by a screw or the like, not shown, to the inner side of one of the reel's side flanges, for example, to flange 31 for receiving and holding the female connector on a hose coiled upon reel R when required. Another resilient clip 21 can be welded, or otherwise attached to the inside of one of the braces 7 or 7a, for example, to brace 7 as seen in FIGURE 6, for receiving and holding the nozzle or male connector of a hose coiled upon reel R when required. Such a nozzle-carrying hose, designated H, is partially shown in phantom lines in FIGure 1. It is also evident from FIGURE 1 how the open space defined by knee portions 5 and 5a allows clearance space in which reel R can rotate.

As previously stated, the primary function of my vehicle is for transporting handle-including receptacles, such as a garbage can. To perform such transportation a user would first back my vehicle astraddle and over a garbage can such as 35 until knee portions 5 and 5a contacted the can as seen in FIG. 3. Next he would suspend each strap 15 from whatever parts of opposite hooks 13 most directly overlay the center of the can's handles 36. Now the user, by adjusting the strap on the hooks 13, would drop hook 17 low enough to allow the handgrip portion of each of the can's handles 36 to be placed into the bights of hooks 17. When the can's handles are so placed, the user repairs to the rear of the vehicle, grasps and lifts up on handle portions 3 and 3a evenly, and is then able to wheel his load wherever he desires. During transport the can is prevented from swinging excessively since it slung forwardly between knee portions 5 and 5a.

When the table attachment is not located on the vehicle, the garbage can can be left permanently hooked to the vehicle if desired since the portions 4 and 4a are spaced sufficiently far apart to allow removal and replacement of the can's lid 37 when necessary.

In FIGURE 4 I show an all-purpose receptacle designated generally as 38. This receptacle includes a high back 39, two equally high sides 40 and 41 integral with and located at right angles to the back, a bottom 42 integral with, but perpendicular to, elements 39, 40 and 41, and a low front 43 integral with, but perpendicular to, elements 40, 41 and 42. Near the centers of the tops of sides 40 and 41, I provide handle-forming apertures 44 and 45, into which the bights of hooks 17 can be entered. The forward edges of sides 40 and 41 are thickened as at 46 and 47 to provide material from which opposing vertical grooves 48 and 49 are cut out. These grooves are for the reception of tongues, one of which is seen at 50, on opposite ends of one or more wall-forming boards 51.

While I would prefer to mold my receptacle 38 and boards 51 from fiber glass, or the like, it is obvious that it might well be made out of wood or metal. I term it an all-purpose receptacle since it is useful for many jobs about a house and lawn, for example, hauling cut grass, or trash, or as a collection receptacle for tin cans, or the like. The receptacle 38 is transported by my vehicle in the same fashion as a garbage can, except that the knee portions 5 and 5a will not span the receptacle, but will bear against spaced points on back 39.

With further regard to the hose reel R, it can be used on or off the vehicles as desired. If used on the vehicle, the entire reel assembly can be rotated since grooves 26 and 27 form bearings upon which the reel axle 28 is supported for rotation. In this regard, I should like to point out that the lowermost portions of notches 26 and 27 are made slightly narrower than the diameter of axle 28 so that the axle can be made to rotate in these notches only with some effort. This expedient substantially prevents unwanted rotation of reel R due to vibration, for example, when the vehicle is being wheeled between places of use and storage since friction developed by axle 28 wedging downward in notches 26 and 27 will hold the reel substantially stationary.

With further regard to the table attachment T, it should be noted that stop flange 20 allows a certain amount of material to be transported on the table portion 19 even while portion 19 is inclined forwardly and downwardly since flange 20 will prevent the material from falling forwardly off of the table portion. Also, it should be observed that when table T is attached to the vehicle, the two forward clips 21 plus element 19 act as an additional brace in that they cooperate to prevent elements 4 and 4a from spreading apart at their forward ends.

Having now described the elements, and various modes of operation of my invention, what I claim as new and desire to secure by Letters Patent is:

1. A utility vehicle comprising: a pair of spaced apart substantially horizontal load-supporting portions each having a front end and a rear end; a handle portion attached to the rear end of each of said supporting portions; a leg attached to and depending from each of said supporting portions near the rear end thereof; a knee-forming portion attached to and extending downwardly inwardly and rearwardly and then downwardly, outwardly and forwardly from each of said supporting portions; an axle-attaching portion attached to and extending inwardly from the lower end of each of said knee forming portions; an axle attached to and extending between said axle-attaching portions; a wheel rotatably mounted on said axle; and load suspending means attached to and depending from each of said load-supporting portions forwardly of said legs but rearwardly of said knee-forming portions, said knee-forming portions providing a pair of spaced-apart knees adapted to simultaneously engage and stabilize a load suspended from said load-suspending means.

2. The combination of claim 1 including removable brace means attached to and between said load-supporting portions for aiding in preventing said load-supporting portions from spreading apart relative to each other.

3. The combination of claim 2, said removable brace means including a pair of spaced-apart, downwardlyopening resilient clips attached to the bottom of a substantially horizontally disposed member.

4. The combination of claim 1 including means on each of said load-supporting portions providing for adjustment of each of said load-suspending means to a plurality of positions between said knee-forming portions and said legs.

5. The combination of claim 1 including ground penetrating means attached to and depending from the lower end of each leg, said ground penetrating means each including a vertically oriented projection which is substantially smaller in any horizontally measured dimension than the lower end of the leg from which it depends.

6. The combination of claim 1 including a pair of spaced braces, one brace interconnecting the bottom and top end of each knee-forming portion, and means cooperating with a bracket fixed on each brace to aid in preventing said braces and said knee-forming portions from spreading apart.

References Cited in the file of this patent

UNITED STATES PATENTS

| | | |
|---|---|---|
| 344,684 | Sherer | June 29, 1886 |
| 1,608,371 | Carroll | Nov. 23, 1926 |
| 2,396,325 | Jimenez | Mar. 12, 1946 |
| 2,603,501 | Graves | July 15, 1952 |
| 2,702,139 | Faustine | Feb. 15, 1955 |
| 2,714,461 | Walker | Aug. 2, 1955 |